United States Patent [19]

Younes

[11] Patent Number: 5,357,026
[45] Date of Patent: Oct. 18, 1994

[54] FLAME RETARDANT SRIM COMPOSITIONS

[75] Inventor: Usama E. Younes, Newtown Square, Pa.

[73] Assignee: ARCO Chemical Technology, L.P., Greenville, Del.

[21] Appl. No.: 732,542

[22] Filed: Jul. 19, 1991

[51] Int. Cl.$^5$ .............. C08G 18/08; C08L 75/04; C08K 3/20; C08K 3/40
[52] U.S. Cl. .................... 528/53; 524/409; 524/430; 524/432; 524/468; 524/494; 524/507
[58] Field of Search .............. 524/468, 430, 432; 528/53, 295.5

[56] References Cited

U.S. PATENT DOCUMENTS 4,644,048 2/1987 Magnus et al. .................. 528/295.5
5,066,625 11/1991 Hanak et al. .................... 528/53

OTHER PUBLICATIONS

Younes et al. *SAE Technical Paper Series* 880432 International Congress & Exposition, Feb. 29–Mar. 4, 1988.
Younes et al., *Polyurethanes World Congress* 1987, Sep. 29–Oct. 2, 1987, p. 133.
Younes et al., *J. Cell Plastics* 24, 164 (1988).
Younes, *Polyurethanes 89: Proceedings SPI 32nd Annual Technical/Marketing Conference,* Oct. 1–4, 1989, p. 292.
Yoonès, *Proceedings of the Sixth Annual ASM/ESD Advanced Composites Conference,* Oct. 8–11, 1990, p. 657.
Younes, *Polyurethane 90: Proceedings SPI 33rd Annual Technical/Marketing Conference,* Sep. 30–Oct. 3, 1990, p. 610.

*Primary Examiner*—Paul R. Michl
*Assistant Examiner*—Tae H. Yoon
*Attorney, Agent, or Firm*—Stephen D. Harper

[57] ABSTRACT

Flame retardant reaction injection molded (RIM) or structural RIM (SRIM) resins having improved time retardant properties may be produced by the addition of a halogenated vinyl resin. Suitable halogenated resins include polyvinyl chloride (PVC) and chlorinated PVC (CPVC). A synergist may be present to further enhance the fire retardant properties, which may be antimony trioxide, antimony pentoxide and the like. The resulting RIM resins may also have glass fibers or other materials present therein to provide structural improvements. The physical properties of RIM and SRIM compositions do not suffer from the addition of these flame retardant additives.

15 Claims, No Drawings

FLAME RETARDANT SRIM COMPOSITIONS

CROSS-REFERENCE TO RELATED APPLICATION

This application is related to U.S. patent application Ser. No. 07/339,288 which concerns flexible, cellular polyurethane foams having improved flame retardant properties through the use of chlorinated polyvinyl chloride (CPVC) as an additive.

FIELD OF THE INVENTION

The invention relates to reaction injection molded (RIM) resins, and in one aspect, is more particularly related to polymeric blends of polyisocyanurates useful in structural reaction injection molded (SRIM) resins having flame retardant additives therein.

BACKGROUND OF THE INVENTION

The preparation of reaction injection molded (RIM) elastomers such as non-cellular, rigid polyisocyanurate products is known and has become popular for the preparation of automobile body parts and other applications. Generally, the commercial RIM machines are of the two stream variety to prepare the reacted products, however three, four or more may be employed. The preparation of polyisocyanurate resins using a wide variety of trimerization catalysts is also known.

Rigid non-cellular polyurethane compositions from polyether polyols, isocyanates and organic carbonates are known using various modifiers and catalysts. The preparation of laminated composites are also well known and the laminates may contain such materials as metal, wood or other cellulosic material, plastic, glass, or ceramics. These resins may also be filled with fibers of these materials to add structural strength.

These reinforced resin components, also called structural RIM or SRIM, are also used in the automotive industry as substances to replace metal. ARSET® HI2801 and ARSET HT3500 resins are used to give polymers with high elongation, according to U. E. Younes, "Resins Resist Impact: Versatile SRIM Composites," *Urethanes Technology*, June/July 1990, pp. 20-23. RIM compositions using these resins which contain a soluble adduct of a tertiary amine and a cyclic alkylene carbonate as a catalyst are described in U.S. Pat. Nos. 4,709,002; 4,731,427; 4,757,123; 4,800,058; 4,879,164; and 4,886,700, incorporated by reference.

Polyurethane foams, as contrasted with RIM plastics, are known to burn readily and considerable effort has been devoted to reducing the flammability of the foams. One technique by which this may be done is through the use of additives to the foam that retard its flammability or help to extinguish the burning foam, should it ignite. Known flame retardant additives include 2,3-dibromo-1,4-butenediol; tris(2-chloroethyl)-phosphate and triethylphosphate, for example. However, a disadvantage of using the phosphate-containing additives is that often relatively large quantities of the expensive materials must be used, higher than about 1%. Additionally, phosphorus flame retardants can create a plasticizing effect which causes the polyurethane foam to be reduced in hardness, lower in compressive strength and increased in density so that the foam is detrimentally affected. These conventional flame retardants are also somewhat volatile and may evaporate out of the polyurethane foam over time, thus decreasing the available fire retardancy. Finally, there are indications that these materials may be corrosive to certain metals on which the foams are applied.

Considerable research has been conducted on flame retardant additives for polyurethane foams. For example, U.S. Pat. No. 4,221,875 describes flame resistant and non-corrosive polyurethane foams made by foaming a raw material mixture comprising a polyhydroxyl compound, polyisocyanate, blowing agent, etc., to be carried out in the presence of melamine powder added thereto as a novel flame retardant. See also UK Patent Application GB 2,177,405A which relates to flame retardant polyurethane foams prepared by reacting a polyoxyalkylene polyether polyol with an organic polyisocyanate and a blowing agent in a process where melamine is incorporated as the sole flame retardant compound. The amount of melamine ranges from 10 wt. % to 55 wt. % of the total composition. UK Patent Application GB 2,177,406A is similar to UK Patent Application 2,177,405A, except that another flame retardant is also used in combination with the melamine, where the other flame retardant may include tris($\beta$-chloroethyl)phosphate, pentabromodiphenyl oxide, tris(2,3-dibromopropyl)phosphate and tris($\beta$-chloropropyl)phosphate.

It is further well known to use chlorinated polyvinyl chloride in polyurethane compositions. Studies of the miscibility of blends of these systems are reported in D. Garcia, "Blends of a Chlorinated Poly(Vinyl Chloride) (CPVC) with a Polyurethane," *Polymer Preparations*, Vol. 27, No. 1, 1986, pp. 259060; D. Garcia, "Blends of a Chlorinated Poly(vinyl Chloride) with a Polyurethane," *Journal of Polymer Science*, Vol. 24, 1986, (pp. 1577-1586); and D. Garcia, "Blends of a Chlorinated Poly(vinyl) Chloride) (CPVC) with a Polyurethane," Polymer Preparations, Vol. 38, No. 1, 1987, pp. 120-1. It is noted that since these are miscibility studies, the proportion of chlorinated polyvinyl chloride to urethane is very high, sometimes over 40%.

Chlorinated polyvinyl chloride is also known to be used in polyurethane compositions to affect the viscosity. In *Chemical Abstracts* 106:(6):3471 g (1986), the viscosity of polypropylene glycol-TDI-trimethylolpropane copolymer and CPVC coating systems containing diluent plasticizers and polyols depended on the chemical nature of the diluents and on the content of the CPVC modifier. The incorporation of greater than 15% CPVC into a polyurethane film-forming composition comprising a copolymer of THF, propylene oxide, trimethylolpropane and TDI decreased (1) the curing time from 12 to 6-9 hours, (2) the gel-fraction content from 97 to 77-84%, (3) the relative hardness from 0.51 to 0.42-0.45, (4) the impact strength by approximately $5-20 \times 10^{-2}$ kg-m, and (5) elasticity as well, but increased (1) the wear by approximately $58-90 \times 10^{-5}$ kg/m$^2$-m, (2) the tensile strength, and (3) the resistance of the composition to the action of 20% aq. HNO$_3$, NaOH and water, according to *Chemical Abstracts* 95(22):188122e (1980). The recitation in *Chemical Abstracts* 92(26):216307c(1980) may also be of interest. The abstract describes a composition of 100 pans NCO-terminated polyurethane and 10-50 pans 20-40% CPVC solution in ethyl acetate which additionally contains 5-20 pans polyisocyanate and 1-10 pans ethoxylated alkylphenol for improved shelf life and for increased strength of the adhesive bond.

A known material for improving flammability in plastics is antimony trioxide (Sb$_2$O$_3$).

"The most useful material imparting flame retardance to plastics is antimony trioxide. It must be used with a source of available chlorine to be effective; it is presumed that antimony oxychloride is the active flame-retarding agent." F. W. Billmeyer, Jr., *Textbook of Polymer Science*, Wiley/Interscience, New York, 1971, p. 502 referring to J. A. Holderreid, "Flame retardants," p. 274, 276, 288, 290 in Sidney Gross, ed., Modern Plastics Encyclopedia 1969-1970, McGraw-Hill, New York, Vol 46, No. 10A, October, 1969.

Antimony pentoxide, $Sb_2O_5$, is also known as a time retardant for textiles. See Irving Sax, et al., *Hawley's Condensed Chemical Dictionary, Eleventh Edition*, Van Nostrand Reinhold, New York, 1987, p. 91.

Also of interest is U.S. Pat. No. 4,711,941, which relates to a moldable composition having a novel random bromostyrene-containing copolymer, a thermoplastic resin, preferably a polycarbonate, and a flame-retardant synergist. The list of suitable synergists includes antimony trioxide, antimony pentoxide, arsenic trioxide, arsenic pentoxide, zinc sulfate, zinc oxide, zinc borate, bismuth oxide, molybdenum oxide, tungsten oxide, stannous oxide, and their mixtures, with antimony trioxide being the preferred synergist.

It will be appreciated that, like many additives because a flame retardant shows promise with respect to one plastic, e.g. polyurethane flexible foams or molded polycarbonate copolymers, that one skilled in the art would not know in advance that the same additive would work in a different plastic, e.g. polyisocyanurate RIM, SRIM or reinforced RIM (RRIM).

Now flammability of RIM and SRIM materials is also an important issue, and improvements in this area are always sought. While additives might be useful in this regard, little is known of useful fire retardant additives for RIM materials.

SUMMARY OF THE INVENTION

Accordingly, it is an object of the present invention to provide a fire retardant reaction injection molded (RIM) composition having improved fire retardancy.

It is another object of the present invention to provide a flame retardant RIM composition using additives that may be easily incorporated into conventional RIM formulations.

Still another object of the present invention is to provide a flame retardant RIM composition that does not possess many of the disadvantages of conventional flame retardants, and which does not adversely affect the physical properties of the RIM compositions.

In carrying out these and other objects of the invention, there is provided, in one form, a fire retardant reaction injection molded (RIM) composition made by the process comprising reacting in a closed mold ingredients comprising a polyol; a polyisocyanate; at least one catalyst effective to simultaneously promote trimerization of the polyisocyanate and reaction of the polyol and the polyisocyanate; and a halogenated flame retardant vinyl resin.

DETAILED DESCRIPTION OF THE INVENTION

It has been discovered that rigid, non-cellular, time retardant reaction injection molded (RIM) compositions, and particularly structural RIM compositions (SRIM), may be made by the addition of halogenated vinyl resins. Sometimes these RIM materials are referred to as polyurethane-modified polyisocyanurates. These compositions include a polymeric blend of polyurethane or modified polyurethane with halogenated resins such as polyvinyl chloride (PVC) or chlorinated PVC (CPVC), and a synergistic material such as antimony trioxide ($Sb_2O_3$). Modified polyurethane includes, but is not limited to, modifications with isocyanurates and oxazolines. Simply, these are the common reaction products found in RIM materials.

The invention is also suitable for use in reinforced RIM (RRIM) where the RIM resin is filled with powders. Additionally, RRIM is mostly isocyanurate, rather than polyol.

The flame retardants of the invention are useful in preparing RIM and SRIM materials which have a high degree of flame retardancy and a minimal effect on the mechanical properties. Such materials may or may not be reinforced with fibers (such as glass, carbon or Kevlar TM aromatic polyamide fibers of E.I. DuPont deNemours & Company) and may be processed by conventional RIM equipment which is designed to handle fibers and other fillers. In addition to processing by RIM equipment, these polymers can be formed by east molding techniques, where the liquid resin is placed into a mold and allowed to cure.

The halogenated flame retardant vinyl resin may include any effective halogenated polymer, but is preferably either PVC or CPVC or a combination of the two. As will be shown, less material by weight is required if CPVC is used, as compared with PVC Other halogenated polymers such as polyvinylidene chloride (e.g. SARAN resins available from Dow Chemical) and copolymers of vinyl chloride or vinylidene chloride with non-halogenated monomers may also be employed, if desired. The halogenated resin and the synergist, if one is employed, may be added in a powder form, and in one aspect of the invention, may be suspended in the polyol prior to foaming to give a CPVC polymer polyol. The CPVC may contain from about 58 to about 72% chloride, preferably from about 60 to 70%.

When the compositions of this invention are prepared using fiber mats to reinforce the thermoset resin, it is particularly desirable to employ very finely powdered halogenareal vinyl resin. It has been discovered that if relatively large particles (e.g. 80–100 microns) of halogenated vinyl resin are used, the fiber mat tends to act as a filter when the components of the composition are introduced into a mold containing the fiber mat. As a result, the distribution of the particles throughout the molded thermoset article becomes very uneven and the physical and flame retardant properties of the article may be adversely affected. Finely powdered vinyl resin (preferably, about 1–10 microns average particle diameter), on the other hand, readily penetrates into and through the fiber mat. It will be apparent that what is important is not an absolute resin particle size, but a relative ratio of average particle diameter to the spaces between fibers in the mat. Roughly, the average particle diameter may be from about one-fifth or less of the average distance between fibers in the mat, and preferably from about one-tenth or less of this distance.

Suitable synergists include, but are not limited to, antimony trioxide, antimony pentoxide, arsenic trioxide, arsenic pentoxide, zinc sulfate, zinc oxide, zinc borate, bismuth oxide, molybdenum oxide, tungsten oxide, stannous oxide and mixtures thereof. Antimony trioxide and antimony pentoxide are the preferred synergists, with antimony trioxide being especially preferred.

The halogenated resin, such as PVC or CPVC, may be present in the formulation in an amount ranging from about 1 to about 40 pph, more preferably in a range from about 15-to about 25 pph. The synergist may be present in the formulation in an amount ranging from about 0 to about 15 pph, and in one embodiment from about 0.05 pph to about 15.0 pph, more preferably in a range from about 0.5 pph to about 5.0 pph. Melamine may be optionally used in these-formulations, but is not considered a synergist.

A wide variety of organic isocyanates including aliphatic, alicyclic and aromatic polyisocyanates may be employed in the instant invention and are characterized by containing two or more isocyanate (NCO) groups per molecule. Typical organic di- or polyisocyanates include p-phenylene diisocyanate; polymethylene polyphenyl isocyanate; toluene-2,4- and 2,6-diisocyanate or mixtures thereof; diansidine diisocyanate; hexamethylene diisocyanate; naphthalene-1,4-diisocyanate; naphthalene-1,4-diisocyanate; octylene-1,8-diisocyanate; 4,4'-diphenylpropane diisocyanate; 3,3'-dimethyl diphenylmethane-4,4'-diisocyanate; triphenylmethane triisocyanate; 3,3'-ditolylene-4,4'-diisocyanate; 4-chloro-1,3-phenylene diisocyanate; 1,4-, 1,3- and 1,2-cyclohexylene diisocyanate and in general the isocyanates disclosed in U.S. Pat. No. 3,577,358, incorporated by reference herein. Mixtures of polyisocyanates may be used which for example are the crude mixtures of di- and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. The organic polyisocyanates may be isocyanate-terminated prepolymers made by reacting under standard known conditions, an excess of a polyisocyanate with a polyol which on a polyisocyanate to polyol basis may range from about 20:1 to 2:1 and include, for example, polyethylene glycol, polypropylene glycol, diethylene glycol monobutyl ether, ethylene glycol monoethyl ether, triethylene glycol, etc. as well as glycols or polyglycols partially esterified with carboxylic acids including polyester polyols and polyether polyols. Known processes for the preparation of polyamines and corresponding methylene bridged polyphenyl polyisocyanates therefrom are disclosed in the literature and in many patents; for example U.S. Pat. Nos. 2,683,730; 2,950,263; 3,012,008; 3,334,162 and 3,362,979. The isocyanates may contain impurities or additives such as the carbodiimides or uretoimine modified MDI products. The preferred polyisocyanates are the diphenylmethane diisocyanate 2,4' isomers which may include the 2,2'-isomer and the higher functional polyisocyanate polymethylene polyphenyl isocyanate mixtures, which may contain from about 20 to about 85 wt. % of the diphenylmethane diisocyanate isomers. In general, the organic isocyanates will have a molecular weight in the range of between about 100 and about 10,000. Typical of the preferred polyisocyanates are those sold commercially as "Isonate 143-L" and "Isonate 181" by the Upjohn Company; icarbodiimide modified diphenylmethane diisocyanates and an ethylene glycol capped isocyanate prepolymer having 22.9% NCO respectively, sold as "Rubinate-M" by Rubicon Chemical Inc. and similar diisocyanates. The amount of isocyanate employed in the RIM process mill be from about 95 to about 50 and preferably from about 80 to about 65 parts by weight (pbw) based on the isocyanate-polyol ingredients in the reaction mixture.

The catalysts employed in the instant invention for formation of the polyurethane modified polyisocyanurate polymer are trimerization catalysts and may be soluble complex adducts of a reaction of a tertiary amine and cyclic alkylene carbonates as described below. The preferred catalyst is an adduct of triethylene diamine (DABCO) and propylene carbonate. In order for these catalysts to provide optimum RIM results, i.e., catalyze the RIM reaction in 2 minutes or less, they should be essentially fully aged for periods of from about 1 hour to about 90 days which time period will be dependent on the given catalyst concentration and aging temperature. Aging at ambient temperatures may be employed and would generally be about 12 hours at, for example, a concentration of about 0.5 weight percent. Lesser periods would be realized at higher temperatures, e.g. about 40° C. to about 120° C. and/or at increased concentrations.

The cyclic alkylene carbonates which may be used in conjunction with these types of catalysts include those of the formula

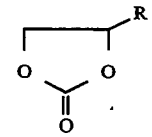

where R is hydrogen, $CH_3$, $C_2H_5$ or $C_3$ to $C_{10}$ hydrocarbons. Typical cyclic alkylene carbonates include, for example, ethylene carbonate, propylene carbonate, butylene carbonate, styrene carbonate and octylene carbonate, mixtures thereof and the like. Liquid alkylene carbonates are preferred, however solid or semi-solid carbonates may be used if liquified with other liquid alkylene carbonates or by the reaction temperature at which they are employed. Propylene carbonate is the preferred cyclic alkylene carbonate. Some of the alkylene carbonate may also be added, in the RIM injection process, along with and mixed with the isocyanate in order to reduce viscosity.

The tertiary amines which may be employed to form the complex adduct catalysts include, for example, N-methyl morpholine; N-ethyl morpholine; dimethylaminocyclohexane; triethylenediamine; bis-(dimethylaminoethyl)ether; dimethylethanolamine; 1,4-dimethylpiperazine; trimethylaminopropylethanolamine; trimethylhydroxyethyl ethylenediamine, N,N,N',N'-tetramethyl ethylene diamine and the like. More information about these soluble carbonate/amine adduct catalysts may be found in U.S. Pat. Nos. 4,709,002; 4,731,427; 4,757,123; 4,800,058; 4,879,164; and 4,886,700, incorporated by reference herein.

A polyurethane catalyst is typically employed in preparing polyurethanes and isocyanurates of the RIM compositions of the invention. Such catalysts may include, but are not limited to, one or more of the following:

(a) Tertiary amines such as trimethylamine; triethylamine; N-methylmorpholine; N-ethylmorpholine; N,N-dimethylbenzylamine; N,N-dimethylethanolamine; N,N,N',N'-tetramethyl-1,4-butanediamine; N,N-dimethylpiperazine; 1,4-diazobicyclo[2.2.2]octane; triethylenediamine and the like;

(b) Tertiary phosphines such as trialkylphosphines; dialkylbenzylphosphines, and the like;

(c) Strong bases, such as alkali and alkaline earth metal hydroxides; alkoxides; and phenoxides;

(d) Acidic metal salts of strong acids, such as ferric chloride; stannic chloride; stannous chloride; antimony trichloride; bismuth nitrate and chloride; and the like;

(e) Chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bis-acetylacetonealkylenediamine; salicyclaldehydeimine; and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals, such as $Ti(OR)_4$; $Sn(OR)_4$; $Al(OR)_3$; and the like, wherein R is alkyl or aryl, and the reaction products of alcoholates with carboxylic acids, $\beta$-diketones, and 2-(N,N-dialkylamino)alcohols;

(g) Salts of organic acids with a variety of metals, such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 pbw percent, based on 100 pbw of the polyol. More often, the amount of the catalyst used is about 0.2 to about 2.0 pbw.

The catalyst is typically employed in the RIM formulation in amounts of from about 0.02 to about 2 pbw, and preferably from about 0.2 to about 1 pbw, based on the total composition.

The polyether polyols or mixtures of polyether polyols suitable in the present invention include those having from 2 to about 10 hydroxyl groups. Such polyether polyols and methods for their preparation are described in *Polyurethanes: Chemistry and Technology*, by Saunders and Frisch, Interscience Publishers, 1964. Particularly suitable polyether polyols include those having molecular weights of from about 200 to about 10,000 or higher and preferably molecular weights of from about 2000 to about 8000 and prepared by reacting an initiator compound having 2 to about 8 hydroxyl groups with an alkylene oxide or mixture of such oxides. Suitable initiator compounds include, for example, ethylene glycol; propylene glycol; water; dipropylene glycol; trimethylene glycol; 1,2-, 1,3 and 1,4-butanediol; glycerol; 1,2,6-hexanetriol; trimethylolethane; trimethylolpropane; pentaerythritol; sorbitol; sucrose and the like. The alkylene oxides suitable for use include ethylene oxide; propylene oxide; 1,2- and 2,3- butylene oxide; styrene oxide; epichlorohydrin; epibromohydrin and mixtures thereof, etc. The polyether polyols may be diols or triols, as well as capped diols or triols or mixtures thereof. Amine or hydroxyl terminated polybutadiene may also be employed. Chain extenders or mixtures thereof may also be employed along with the polyether polyols in the total formulation. Such chain extenders include mixtures of difunctional and trifunctional chain extenders. Typical known chain extenders which may be used include diols, amino alcohols and diamines or mixtures thereof.

It is anticipated further that various polymer polyols will find utility as coreactants with polyisocyanates in the presence of a suitable catalyst to produce the RIM materials of the present invention. Generally, RIM materials are cured at temperatures in the range of 25 to 300° C., and at mold pressures of 0 to 500 ksi.

Although not essential to the practice of the invention, the use of commonly known additives which may enhance color or properties of the polyurethane modified polyisocyanurate polymer or other RIM or SRIM compositions may be used if desired. For example, reinforcing materials which may be in a powder, granular, long fiber or mixed form, such as chopped or milled glass fibers, chopped or mired carbon fibers, silicon fibers, synthetic fibers such as nylon or Kevlar, polyethylene or polypropylene fibers or strands, natural fibers of wool or cotton, cellulosic fibers, etc. may be used. Woven or non-woven mats of the fibers may be employed in a laminate fashion.

The polyisocyanurate compositions, modified or not with polyurethane, are essentially non-cellular. However, due to small amounts of water which may be present in the reaction components, i.e., polyisocyanates, polyols, alkylene carbonate, catalyst, etc., the composition may contain small cells or microcells in the polymer.

Although excellent mold release is obtained with the RIM formulation of the instant invention alone, external or internal mold release agents such as, for example, the dimethyl siloxanes with organic acid groups may be employed.

The invention has been demonstrated in the laboratory. The following are examples of the practice of incorporating halogenated resins and synergists into SRIM formulations. However, the examples are not to be construed as limiting the invention in any way.

EXAMPLES 1 and 2

The following Examples describe the preparation of a flame retardant cast molding composition containing PVC and antimony trioxide. The following components were mixed at room temperature: 60 g. of ARSET HI 2801 polyol, 90 g. of ARSET HI 2801 isocyanate, 30 g. of PVC powder 74 GP-8 (sold by Occidental Chemical Corp.), and 10 g. of antimony trioxide (sold by Anzon Corp.). The mixture was poured onto varying amounts of Owens Corning M8610 continuous glass mat, which were placed in a 12"×12"×0.125" mold heated to 80° C. The mold was closed by means of a hydraulic press. After one minute, the mold was opened and the composites removed. The composites were then cut for testing and physical properties measured, which are shown in Table I below.

TABLE I

| Flame Retardant SRIM using PVC Additive | | |
|---|---|---|
| Parameter or Property | Example 1 | Example 2 |
| % Glass | 19.6 | 46.7 |
| Tensile Strength (ksi[1]) | 10.5 | 22.6 |
| Tensile Modulus (ksi) | 651 | 1300 |
| % Elongation | 1.93 | 2.01 |
| Flexural Strength (ksi) | 17.6 | 30.7 |
| Flexural Modulus (ksi) | 590 | 1080 |
| N.I.[2] (ft-lbs./in) | 4.8 | 10.5 |
| DTUL[3] at 264 psi (°F.) | 327 | 379 |

TABLE I-continued

Flame Retardant SRIM using PVC Additive

| Parameter or Property | Example 1 | Example 2 |
|---|---|---|
| Flammability (UL-94) | V-O[4] | V-O |

[1] 1,000 psi.
[2] Notched Izod impact strength test.
[3] Deflection temperature under load; values above 320° F. are good.
[4] Highest classification for UL-94 test; does not ignite cotton.

EXAMPLES 3 and 4

Examples 3 and 4 were conducted identically to Examples 1 and 2, except that in place of the flame retardant additives therein, 20 g. of CPVC powder (from B.F. Goodrich Chemical Group), and 6 g. of antimony trioxide (sold by Anzon Corp.). Notice that with CPVC less of both of the additives is required. The composites were then cut as before and physical properties measured, which are reported in Table II below.

TABLE II

Flame Retardant SRIM using CPVC Additive

| Parameter or Property | Example 3 | Example 4 |
|---|---|---|
| % Glass | 21.3 | 43.7 |
| Tensile Strength (ksi) | 11.2 | 20.5 |
| Tensile Modulus (ksi) | 696 | 1275 |
| % Elongation | 1.92 | 2.01 |
| Flexural Strength (ksi) | 18.8 | 30.5 |
| Flexural Modulus (ksi) | 615 | 1060 |
| N.I. (ft-lbs./in) | 5.8 | 11.3 |
| DTUL at 264 psi (°F.) | 306 | 384 |
| Flammability (UL-94) | V-O | V-O |

EXAMPLES 5 and 6

These examples present typical properties of ARSET HI 2801 glass composites without a flame retardant additive.

TABLE III

Properties of ARSET HI 2801 Composites Without Flame Retardants

| Parameter or Property | Example 5 | Example 6 |
|---|---|---|
| % Glass | 21 | 47 |
| Tensile Strength (ksi) | 1.30 | 1.55 |
| Tensile Modulus (ksi) | 740 | 1,410 |
| % Elongation | 2.5 | 2.4 |
| Flexural Strength (ksi) | 20.5 | 47 |
| Flexural Modulus (ksi) | 695 | 1,560 |
| N.I. (ft-lbs./in) | 8 | 18 |
| DTUL at 264 psi (°F.) | 390 | 440 |
| Shrinkage, % | 0.15 | 0 |
| Flammability (UL-94) | HB (Burns) | HB (Burns) |

Many modifications may be made in the SRIM and RIM compositions of this invention and their method of production without departing from the spirit and scope of the invention, which are defined only in the appended claims. For example, one skilled in the an could adjust the flame retardant additives, proportions and modes of addition within the parameters set forth to provide resins with particularly advantageous properties.

GLOSSARY

| | |
|---|---|
| ARSET ® HI 2801 polyol | A blend of propylene carbonate, polyether polyols, chain extender and tertiary amine having a specific gravity of 1.04 available from ARCO Chemical Co. |
| ARSET ® HI 2801 isocyanate | A polymethylene polyphenyl isocyanate having a specific gravity of 1.22, a viscosity of 60 cp at 25° C., and an NCO content of about 32% available from ARCO Chemical Co. |
| UL-94 Test | Underwriter's Laboratories UL 94 Test Method, Standard for Tests for Flammability of Plastic Materials For Parts in Devices and Appliances, third edition, Jan. 24, 1980. |

I claim:

1. A fire retardant reaction injection molded (RIM) composition made by the process comprising reacting in a closed mold ingredients comprising
   a polyol;
   a polyisocyanate;
   at least one catalyst effective to simultaneously promote trimerization of the polyisocyanate and reaction of the polyol and the polyisocyanate; and
   a halogenated flame retardant vinyl resin having an average particle diameter of about 1–10 microns;
   to produce a rigid, non-cellular isocyanurate-containing RIM composition.

2. The fire retardant RIM of claim 1 where the halogenated flame retardant vinyl resin is selected from the group consisting of polyvinyl chloride (PVC) and chlorinated polyvinyl chloride (CPVC).

3. The fire retardant RIM composition of claim 1 where the amount of flame retardant vinyl resin ranges from about 1 to about 30 pph.

4. The fire retardant RIM composition of claim 1 where a flame-retardant synergist is additionally present, which is selected from the group consisting of antimony trioxide, antimony pentoxide, arsenic trioxide, arsenic pentoxide, zinc sulfate, zinc oxide, zinc borate, bismuth oxide, molybdenum oxide, tungsten oxide, stannous oxide and mixtures thereof.

5. The fire retardant RIM composition of claim 1 where a synergist is present in an amount ranging from about 0.05 to about 15 pph.

6. The fire retardant RIM composition of claim 1 where reinforcing fibers are also present.

7. The fire retardant RIM composition of claim 6 where the reinforcing fibers are glass.

8. The fire retardant RIM composition of claim 1 where the catalyst is an adduct of a tertiary amine and a cyclic alkylene carbonate soluble in the polyol.

9. A fire retardant reaction injection molded (RIM) composition made by the process comprising reacting in a closed mold ingredients comprising
   a polyol;
   a polyisocyanate;
   at least one catalyst effective to simultaneously promote trimerization of the polyisocyanate and reaction of the polyol and the polyisocyanate;
   a halogenated flame retardant vinyl resin selected from the group consisting of polyvinyl chloride (PVC) and chlorinated polyvinyl chloride (CPVC); and
   a flame-retardant synergist selected from the group consisting of antimony trioxide, antimony pentoxide, arsenic trioxide, arsenic pentoxide, zinc sulfate, zinc oxide, zinc borate, bismuth oxide, molybdenum oxide, tungsten oxide, stannous oxide and mixtures thereof;.
   where the halogenated flame retardant vinyl resin and the flame-retardant synergist each have an average particle diameter of about 1–10 microns, to produce a rigid, non-cellular isocyanarate-containing RIM composition.

10. The fire retardant RIM composition of claim 9 where the amount of flame retardant vinyl resin ranges from about 1 to about 30 pph.

11. The fire retardant RIM composition of claim 9 where the amount of synergist ranges from about 0.05 to about 15 pph.

12. The fire retardant RIM composition of claim 9 where reinforcing fibers are also present.

13. The fire retardant RIM composition of claim 12 where the reinforcing fibers are glass.

14. The fire retardant RIM composition of claim 9 where the catalyst is an adduct of a tertiary amine and a cyclic alkylene carbonate soluble in the polyol.

15. A fire retardant structural reaction injection molded (SRIM) composition made by the process comprising reacting in a closed mold ingredients comprising a polyol;

a polyisocyanate;

at least one catalyst effective to simultaneously promote trimerization of the polyisocyanate and reaction of the polyol and the polyisocyanate, which catalyst comprises a soluble adduct of a tertiary amine and a cyclic alkylene carbonate;

a halogenated flame retardant vinyl resin selected from the group consisting of polyvinyl chloride (PVC) and chlorinated polyvinyl chloride (CPVC), in an amount ranging from about 1 to about 30 pph;

a flame-retardant synergist selected from the group consisting of antimony trioxide, antimony pentoxide, arsenic trioxide, arsenic pentoxide, zinc sulfate, zinc oxide, zinc borate, bismuth oxide, molybdenum oxide, tungsten oxide, stannous oxide and mixtures thereof, in an amount ranging from about 0 to about 15 pph; and reinforcing glass fibers;

where the halogenated flame retardant vinyl resin and the flame-retardant synergist each have an average particle diameter of about 1–10 microns, to produce a rigid, non-cellular isocyanurate-containing SRIM composition.

* * * * *